United States Patent [19]

Sauber

[11] 4,445,668

[45] May 1, 1984

[54] CABLE FEEDING SYSTEM

[76] Inventor: Charles J. Sauber, 10 N. Sauber Rd., Virgil, Ill. 60182

[21] Appl. No.: 401,866

[22] Filed: Jul. 26, 1982

[51] Int. Cl.³ .................. B65H 17/34; B65H 17/22
[52] U.S. Cl. .................... 254/287; 254/214; 226/177; 226/181
[58] Field of Search .......... 254/134.3 R, 287, 214, 254/215; 226/177, 176, 181; 254/391; 15/3.51, 3.52, 104.35 N, 104.06 A

[56] References Cited

U.S. PATENT DOCUMENTS

| | | | |
|---|---|---|---|
| 644,884 | 3/1900 | Wrigley | 226/177 X |
| 1,217,457 | 2/1917 | Jordan | 254/287 |
| 2,262,364 | 11/1941 | Hügel et al. | 254/134.3 R X |
| 3,774,827 | 11/1973 | Graybeal | 15/104.35 N X |
| 3,859,687 | 1/1975 | Caperton | 15/104.35 N |
| 4,235,362 | 11/1980 | Hubenko | 226/181 |

*Primary Examiner*—Stuart S. Levy
*Assistant Examiner*—Thomas R. Hannon
*Attorney, Agent, or Firm*—Leydig, Voit, Osann, Mayer & Holt, Ltd.

[57] ABSTRACT

A cable feeding and brake device for use in controllably lowering hanging cable with the aid of gravity through passage means between floors of a high-rise building wherein the device includes a housing supported by legs, the housing carrying a plurality of rollers defining a guideway for the cable between rollers disposed on opposite sides of the cable passing through the guideway, a manually rotatable hand wheel positively turns a pair of the rollers through a chain drive and a manual adjustment urges a roller on the opposite side of the cable between the spaced driven rollers to deflect the cable thereby providing a holding resistance against downward pulling of the cable through the housing guideway. The device is also provided with a manually operated brake which positively clamps and holds the cable in a desired fixed position.

5 Claims, 4 Drawing Figures

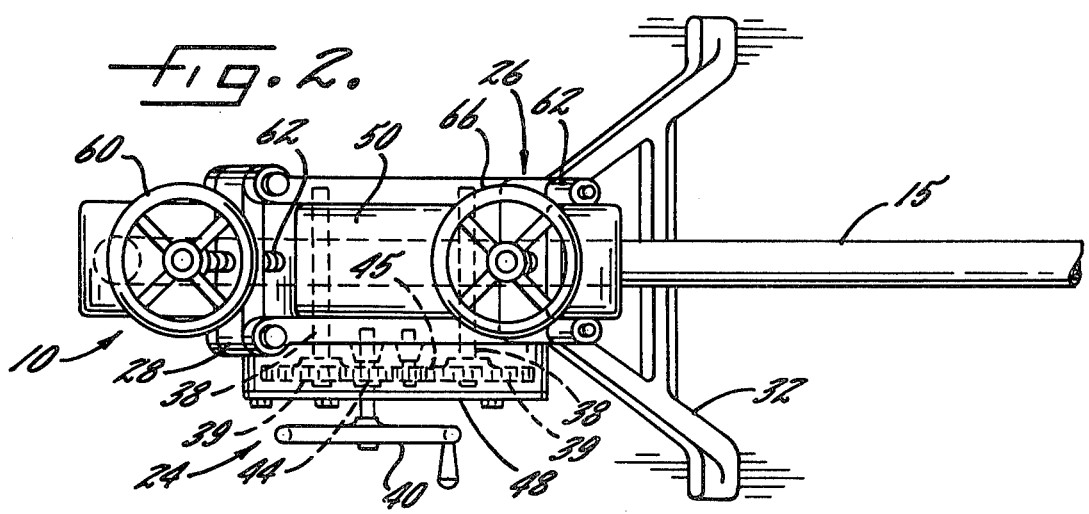
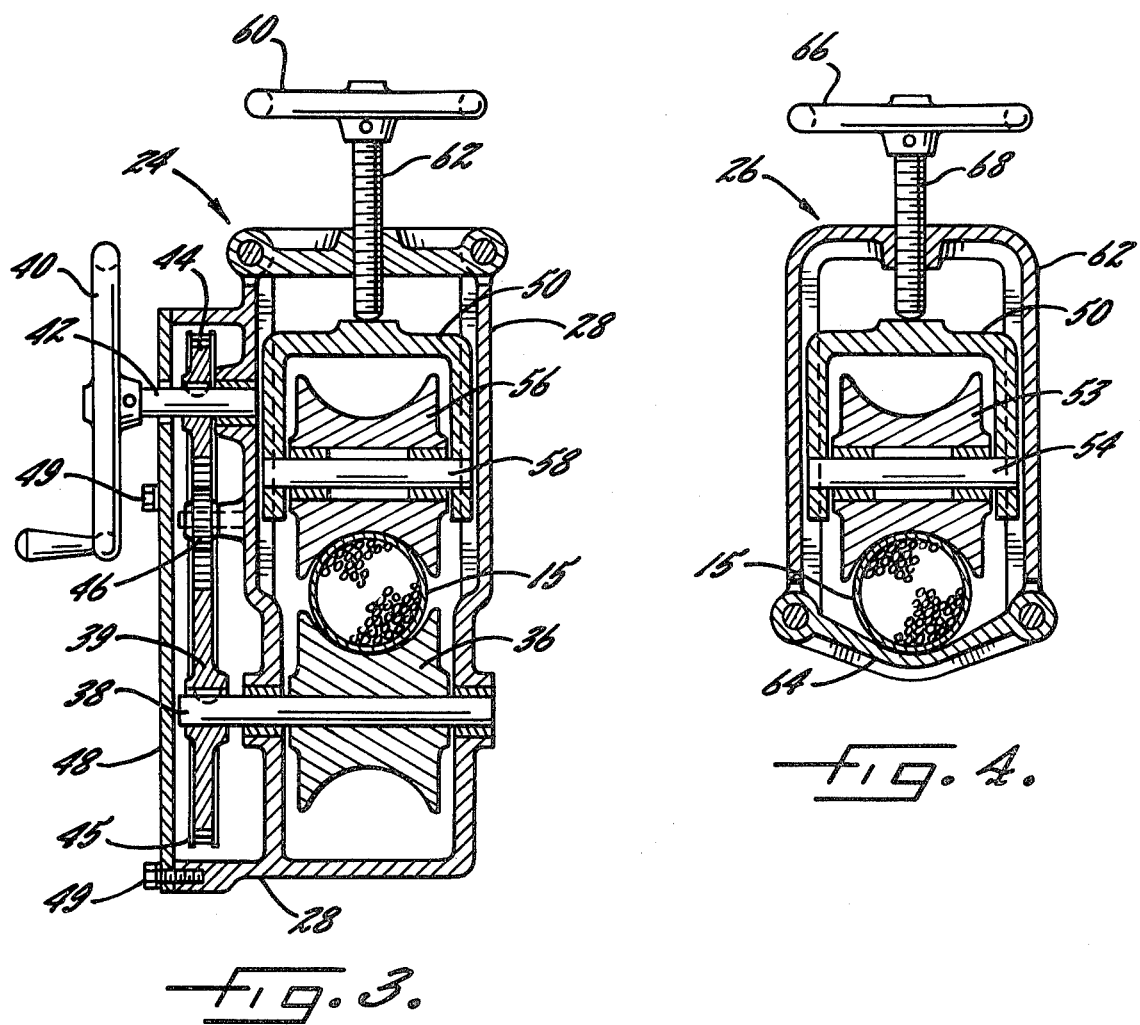

CABLE FEEDING SYSTEM

FIELD OF THE INVENTION

The present invention relates generally to feeding and braking devices for electrical cable and more particularly to an improved cable feeding brake system for installing long hanging cables such as, for example, telephone cables in high-rise buildings.

BACKGROUND OF THE INVENTION

In multi-story or high-rise buildings, long electrical cables, such as telephone lines, are strung from the bottom to the top of such buildings usually disposed in wiring closets which provide a continuous shaft before floors. The common practice for stringing such cables has been to set up a winch in the top floor of the building that lowers a fish cable and then the electrical wire cable is pulled up from the bottom to the top by the winch reeling in the fish cable. With telephone lines, a cable can contain up to 3,600 pairs of wires with the cable being about 3½ inches in diameter and weighing approximately 8 pounds per lineal foot. In order to handle the cable weights involved, the winches that had to be used were quite large pieces of equipment, cumbersome to use and difficult to set up and move. In addition, which fish cables suffer drawbacks of requiring maintenance, inspection and even replacement since they must bear up against rigorous and repeated use encountered in lowering the fish cables and raising them through conduits and floorings where the fish cables can suffer wear or damage. Since the cumulative weight of the electrical cable is so much greater for very tall buildings, installers either have to have a number of different size winch equipment for varying height buildings or simply suffer the inefficient use of the largest equipment needed for very tall buildings when working on medium and low-rise buildings.

SUMMARY AND OBJECTS OF THE INVENTION

Accordingly, it a primary object of the present invention to provide an improved cable feeding and brake system which enables electrical cable to be controllably lowered, utilizing gravity to feed the cable from top to bottom of multi-story or high-rise buildings thereby avoiding the use of fish cable winches and rendering it easier to install hanging cable.

It is another object to provide a cable feeding and brake system which is relatively light in weight, simple and reliable to use and move from location to location.

Other objects and advantages of the invention will become apparent as the following description proceeds taken in conjunction with the accompanying drawings.

BRIEF DESCRIPTION OF THE DRAWINGS

FIG. 2 is a top plan view of the cable lowering device shown in FIG. 1;

FIG. 3 is a section taken substantially along the line 3—3 in FIG. 1; and,

FIG. 4 is a section taken substantially along the line 4—4 in FIG. 1;

Figure 1:
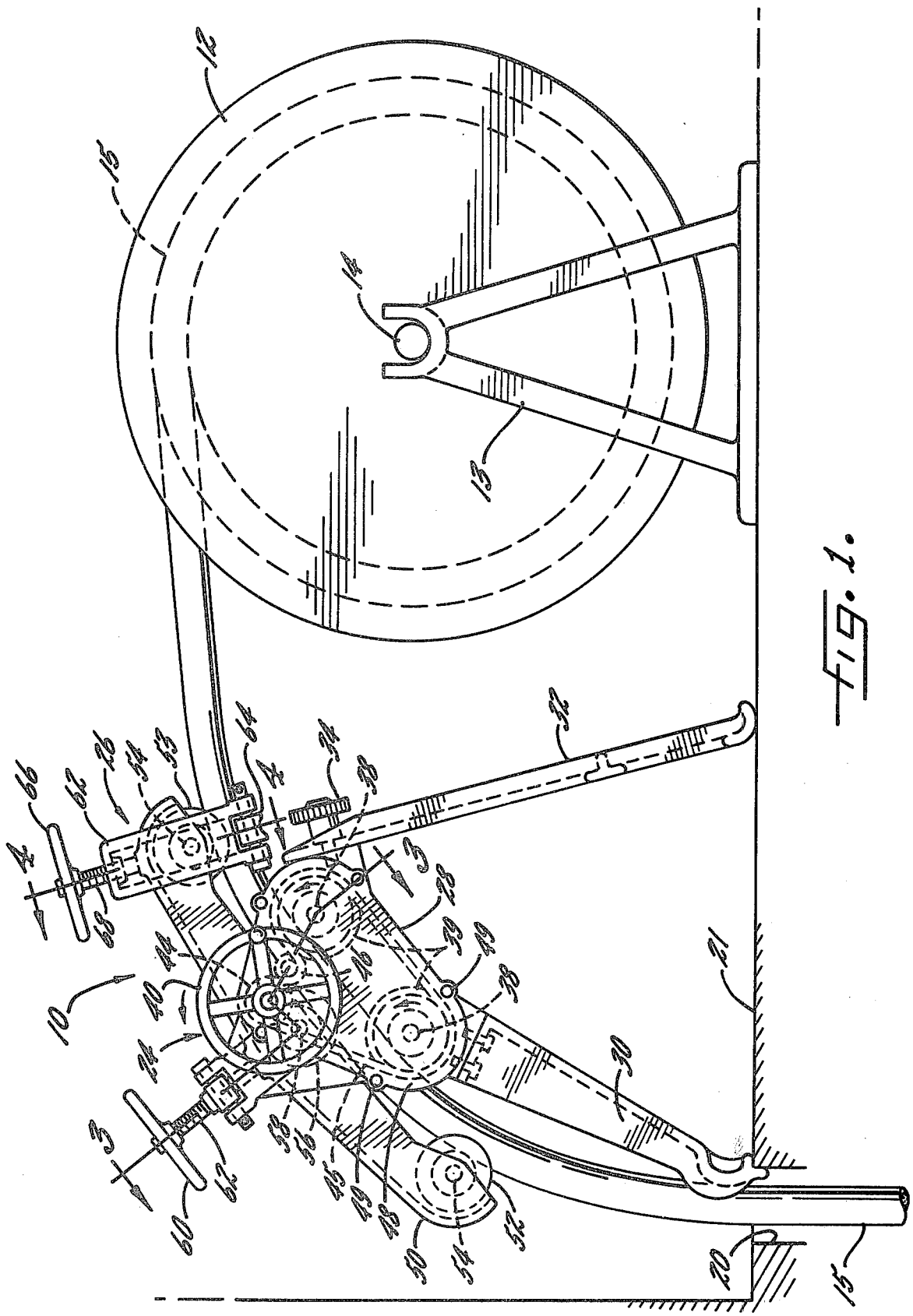
FIG. 1 is a side elevation view of a cable feeding brake system in accordance with the present invention, here shown with reference to its operating to lower cable from a cable spool down through an opening in a building floor.

While the invention will be described in connection with a particular preferred embodiment it will be understood that it is not intended to limit the invention to that particular embodiment. On the contrary, it is intended to cover all alternatives, modifications and equivalents as may be included within the spirit and scope of the invention as defined by the apended claims.

DETAILED DESCRIPTION

Turning now to the drawings, the illustrative cable feeding and brake assembly, generally referred to at 10, in accordance with the present invention is intended to be operated with a cable reel or spool 12 with the reel supported for free rotation on a pair of spaced braces 13 (only one being shown) which receive a shaft 14 passing centrally through the spool. The spool, which is typically one including a cylindrical central drum having enlarged disc-like ends, carries a coiled length of cable 15.

With the cable reel so supported for free rotation, the end of the cable can be fed down through a building floor opening 20 or conduit for lowering it to the next floor. However, it will be appreciated that as this process would be continued, the weight of the cable passing down through the dloors increases so that gravity alone cannot be safely used to simply lower the cable down in a multi-story or high-rise building. Indeed, the cumulative weight of the cable is such that it has been necessary to devise more support arrangement that can be installed at least about every fourth floor. For that purpose, cross-reference is made to my co-pending U.S. application Ser. No. 342,842, filed Jan. 26, 1982, now abandoned in favor of continuation-in-part application Ser. No. 398,067, filed July 14, 1982, which discloses a cable clamping device providing the necessary interfloor support after the cable has been positioned.

In accordance with the present invention, the cable feeder and brake device 10 rests on the floor 21 between the cable reel and the floor opening 20 with the cable passing therethrough and the device includes both a controlled lowering mechanism, indicated at 24, to manually feed the cable downwardly under the gravity pull and means to brake and hold the cables at any desired stage of lowering, indicated at 26.

To this end, there is provided a generally triangular shaped housing 28 adapted to be angularly supported by removable forward leg 30 and a removable rearward generally A-shaped stand 32 (FIG. 2). As shown in FIG. 1, the rear stand 32 is secured to the housing with a release bolt coupling 34 which enables easy assembly and disassembly of the stand.

As viewed in FIGS. 1 and 3, conjointly, the housing 28 lower portion carries a pair of spaced driver rollers 36 supported by shafts 28 journaled to the housing with the ends of the shafts at one side carrying sprockets 39. At the upper end of the housing there is a rotatable handle wheel 40 carried by a journaled shaft 42 which has a sprocket 44 connected thereto. An endless chain is trained around the sprockets 39, 44 and an idler sprocket 46 is provided to keep the chain taut. The arrangement is such that rotation of the handle wheel 40, for example, in the counter-clockwise direction rotates both spaced rolls 36 in the same direction. A cover 48 bolted to the housing by a plurality of bolts 49 encloses the chamber defined for the chain and sprocket drive.

An arm-like member 50 passing through the upper end of the housing 28 and disposed so that the arm 50 is shiftable upwardly and downwardly with respect to the housing 28 carries a plurality of rollers which with the drive rollers 36 defines a cable guideway through the device. At opposite ends of the arm 50 are freely rotatable rollers 52, 53 supported by shafts 54. A third roller 56 is centrally disposed with respect to the arm 50 and carried by a shaft 58. Thus, a cable 15 can pass between the rollers and is engaged by the arm rolls at the top and the housing rolls at the bottom of the cable.

In accordance with one important aspect of the present invention, provision is made for controllably urging the arm 50 toward the cable so that the roll 56 deflects the cable between the rolls 36 carried by the housing which in turn increases resistance provided by the feeding device 10 against the cable freely passing through the rolls. For this purpose, hand wheel 60 operates a threaded shaft 62 passing through the top of the housing 28 and bearing against the arm 50 enables the shifting of the arm upwardly or downwardly by rotation of the handle 60. In accordance with another aspect of the invention, positive brake means 26 is provided which is here shown in the form of a collar member 62 surrounding the roller 53 end of arm 50 and having a brake shoe 64 pinned to the collar 62 so as to underlie a cable 15 passing between the brake shoe and the roller 53. A hand wheel 66 operating a threaded bolt 68 passing through the top of the collar 62 bears against the top of the arm 50 so that rotation of the wheel 66 drives the shaft 68 against the arm 50 and roller 53 and compresses the cable against the brake shoe 64.

In order to more fully understand the operation of the cable feeding and brake assembly, a typical sequence of operation will be described with reference to FIG. 1. With a spool 12 of cable 15 set up on stand 13 adjacent to a floor opening 20 and the feeding device set up therebetween as shown in FIG. 1, both hand wheels 60 and 66 are raised to enable the cable 15 to be fed through the rolls of the device and then fed down through the floor opening by way of manual set up. At this stage, the handle 60 can be turned downward to impart some deflection in the cable by roll 56 engaging the cable between the spaced rolls 36. This then enables the hand wheel 40 to be turned operating the chain and rolls 36 to feed the cable down to the next floor where the end would be entered into the floor opening there and then again continued rotation of handle 40 can feed the cable downwardly for repeating the sequence. At any state, if desired, the brake can be set or released by tightening or loosening the brake shoe with handle 66.

As the lowering operation continues, the weight of the cable descending through the floors increases and additional resistance is required against the cable simply pulling itself freely down through the lowering device. Thus, additional deflection is imparted to the cable by rotation of handle 60 as the operator feels the cable beginning to lower itself when operating the handle 40. With this ability to set the pressure and deflecting of the cable through the roller 56, the operator can safely use gravity to control the lowering of the cable and by way of the brake setting the lowering operation can be stopped and the cable firmly held in any desired position.

I claim as my invention:

1. A cable feeding device such as may be used to controllably lower hanging cable in association with passage means between floors of a building, comprising in combination, a housing, leg means for supporting the housing on the floor in respect to the passage means of said floor, said housing carrying a plurality of rollers defining a guideway for the cable between the rollers disposed on opposite sides of the cable, means for positively manually rotating at least one of the rollers for driving the cable through the housing guideway, means for positively urging a roller on one side of the cable toward a roller on the other side of the cable to increase resistance against downward pulling of the cable through the guideway between the rollers, brake means associated with one of the rollers comprising support means carrying a brake shoe held spaced from a roller so that the cable passes between the shoe and said roller, and manually operated means for adjustably relatively moving said roller and brake shoe to clamp and hold the cable in a fixed position between the roller and brake shoe.

2. A cable feeding device as claimed in claim 1 wherein said roller driving means includes a sprocket for driving the roller, a sprocket driven by a hand wheel, and endless chain means trained around said sprockets.

3. A cable feeding device as claimed in claim 1 wherein said driving means includes a pair of spaced driven rollers journaled within said housing, means for simultaneously rotating both said driver rollers upon rotation of said manual means, and said pressure asserting roller disposed on the opposite side of the cable passing between said roller guideway is positioned between the spaced driven rollers to deflect the cable when said roller urging means is moved toward the driven rollers so that the cable holding resistance is imparted by the cable deflection.

4. A cable feeding device as claimed in claim 1 wherein said leg means are removable.

5. A cable feeding device for electrical cable, comprising in combination, a generally triangular housing, leg means for supporting the housing, said housing carrying a pair of spaced rollers adjacent the lower portion of the housing, vertically moveable arm means carrying a plurality of rollers defining a guideway for the cable between the rollers disposed on opposite sides of the cable, manual means for positively rotating the spaced housing rollers simultaneously for driving the cable through the guideway, means for positively urging the arm and a roller on one side of the cable downward between the spaced driven rollers on the other side of the cable to deflect the cable and increase resistance against downward pulling of the cable through the guideway between the oppositely oriented rollers, and brake clamping means associated with one of the rollers carried by the arm means for positively holding the cable in a fixed manually selected position.

* * * * *

UNITED STATES PATENT AND TRADEMARK OFFICE
CERTIFICATE OF CORRECTION

PATENT NO. : 4,445,668
DATED : May 1, 1984
INVENTOR(S) : Charles J. Sauber

It is certified that error appears in the above-identified patent and that said Letters Patent is hereby corrected as shown below:

At column 1, line 28:

Delete "which" and insert -- winch --;

At column 2, line 25:

Delete "dloors" and insert -- floors --;

At column 2, line 29:

Delete "more" and insert -- some --;

At column 2, line 43:

Delete "cables" and insert -- cable --; and

At column 2, line 54:

Delete "28" and insert -- 38 --;

Signed and Sealed this

Eighteenth Day of September 1984

[SEAL]

*Attest:*

*Attesting Officer*

GERALD J. MOSSINGHOFF

*Commissioner of Patents and Trademarks*